US011615349B2

(12) United States Patent
Dutta et al.

(10) Patent No.: US 11,615,349 B2
(45) Date of Patent: Mar. 28, 2023

(54) PARALLEL BLOCKCHAINS FOR VEHICLE AND USER ID

(71) Applicant: Toyota Motor North America, Inc., Plano, TX (US)

(72) Inventors: Neil Dutta, Addison, TX (US); Senthilkumar Gopal Kalaimani, Frisco, TX (US); Emily S. Lerner, McKinney, TX (US); Mathew Gardner, Lewisville, TX (US); Ashok Ramadass, Plano, TX (US); Michael C. Edwards, McKinney, TX (US); Mark A. McClung, Frisco, TX (US); Ryan Wheeler, Denton, TX (US)

(73) Assignee: Toyota Motor North America, Inc., Plano, TX (US)

( * ) Notice: Subject to any disclaimer, the term of this patent is extended or adjusted under 35 U.S.C. 154(b) by 1158 days.

(21) Appl. No.: 16/200,488

(22) Filed: Nov. 26, 2018

(65) Prior Publication Data

US 2020/0164886 A1 May 28, 2020

(51) Int. Cl.
*H04L 9/06* (2006.01)
*G06Q 10/02* (2012.01)
(Continued)

(52) U.S. Cl.
CPC ......... *G06Q 10/02* (2013.01); *G06F 16/1805* (2019.01); *G06F 16/9035* (2019.01);
(Continued)

(58) Field of Classification Search
CPC ...... H04L 9/0637; G06Q 20/38; G06Q 30/20; G06Q 50/18
See application file for complete search history.

(56) References Cited

U.S. PATENT DOCUMENTS 9,397,985 B1 * 7/2016 Seger, II ............. H04L 63/0442
9,820,120 B2 11/2017 deCharms
(Continued)

FOREIGN PATENT DOCUMENTS

CN 107274130 10/2017
WO WO2018020375 2/2018

OTHER PUBLICATIONS

Chuan Tian; "Ridesharing App Founder Wants to Build a Blockchain Uber"; www.coindesk.com/chinese-ride-hailing-app-founder-wants-to-build-a-blockchain-uber/; 1 page; May 28, 2018.
(Continued)

*Primary Examiner* — Patrick McAtee
*Assistant Examiner* — Nakia Leffall-Allen
(74) *Attorney, Agent, or Firm* — Snell & Wilmer LLP

(57) ABSTRACT

Methods, systems, and devices for a cross-linked distributed ledger. The cross-referencing system includes multiple computing devices including a first computing device and a second computing device. A computing device of the multiple computing devices is configured to maintain a first cross-linked distributed ledger. The first cross-linked distributed ledger has a first set of multiple linked records that are associated with a first identifier. The first computing device includes a processor. The processor is configured to link or provide a first record associated with the first identifier to the first cross-linked distributed ledger. The first record has a first reference to a second record. The second record is within a second set of multiple cross-linked records of a second cross-linked distributed ledger.

7 Claims, 5 Drawing Sheets

(51) Int. Cl.
   *G06F 16/9035* (2019.01)
   *G06F 21/62* (2013.01)
   *G06F 16/18* (2019.01)
   *G06Q 50/30* (2012.01)
   *H04L 9/00* (2022.01)

(52) U.S. Cl.
   CPC ......... *G06F 21/6227* (2013.01); *G06Q 50/30* (2013.01); *H04L 9/0643* (2013.01); *G06Q 2220/00* (2013.01); *H04L 9/50* (2022.05)

(56) References Cited

U.S. PATENT DOCUMENTS

| | | | |
|---|---|---|---|
| 9,825,931 B2 * | 11/2017 | Johnsrud | H04L 63/08 |
| 9,988,058 B2 | 6/2018 | Phillips | |
| 10,157,078 B2 * | 12/2018 | Curtis | G06F 16/27 |
| 10,719,501 B1 * | 7/2020 | Leise | G06F 16/27 |
| 10,805,068 B1 * | 10/2020 | Leise | H04W 12/106 |
| 2015/0025705 A1 | 1/2015 | Burger | |
| 2016/0217532 A1 | 7/2016 | Slavin | |
| 2017/0046652 A1 | 2/2017 | Haldenby et al. | |
| 2017/0046806 A1 * | 2/2017 | Haldenby | H04L 9/0861 |
| 2017/0132615 A1 | 5/2017 | Castinado et al. | |
| 2017/0352012 A1 | 12/2017 | Hearn et al. | |
| 2017/0372431 A1 | 12/2017 | Perl et al. | |
| 2018/0018723 A1 | 1/2018 | Nagla et al. | |
| 2018/0061237 A1 | 3/2018 | Erickson et al. | |
| 2018/0091596 A1 | 3/2018 | Alvarez et al. | |
| 2018/0248699 A1 * | 8/2018 | Andrade | H04L 9/0897 |
| 2018/0343120 A1 * | 11/2018 | Andrade | H04L 9/0637 |

OTHER PUBLICATIONS

Thompson et al.; "On Charge Point Anxiety and the Sharing Economy"; *2017 IEEE 20th International Conference on Intelligent Transportation Systems (ITSC)*;14 pages; Oct. 16-19, 2017.

* cited by examiner

PARALLEL BLOCKCHAINS FOR VEHICLE AND USER ID

BACKGROUND

1. Field

The present disclosure relates to systems, apparatuses, devices and methods for automatically recording vehicle and user data using blockchain technology.

2. Description of the Related Art

Rental companies and/or ride-sharing companies operate multiple vehicles, which are operated and used by multiple drivers and/or members. The rental and/or ride-sharing companies store information regarding the multiple vehicles, the multiple drivers and/or members in one or more networked databases. The records associated with the multiple drivers and/or vehicles are constantly altered and/or modified. These networked databases do not keep and/or maintain a permanent record of the changes made to the records. Moreover, the networked databases may contain various inaccuracies when data is entered into the one or more databases. Additionally, the one or more networked databases may not communicate and share information with each other.

A distributed ledger is a type of database that is shared, replicated, and synchronized among the members of a decentralized network. By sharing and replicating the data across multiple members of a decentralized network, multiple parties may authenticate and verity the data. Moreover, permanent records may be maintained. The distributed ledger records the transactions, and participants in the network govern and agree by consensus on any updates to the records in the distributed ledger. The distributed ledger permanently records in cryptographic hash-linked blocks the history of the records. The one or more distributed ledgers, however, are not linked between each other, and so, a member of one distributed ledger still does not have access to information on another related distributed ledger.

Accordingly, there is a need for a system, apparatus and/or method for a cross-linked distributed ledger to accurately and immutably collaborate, integrate, and permanently record transactions for the management and cross-referencing of records.

SUMMARY

In general, one aspect of the subject matter described in this specification is embodied in a cross-linked distributed ledger. The cross-linked distributed ledger includes multiple computing devices including a first computing device and a second computing device. A computing device of the multiple computing devices is configured to maintain a first cross-linked distributed ledger. The first cross-linked distributed ledger has a first set of multiple linked records that are associated with a first identifier. The first computing device includes a processor. The processor is configured to link or provide a first record associated with the first identifier to the first cross-linked distributed ledger. The first record has a first reference to a second record. The second record is within a second set of multiple cross-linked records of a second cross-linked distributed ledger.

These and other embodiments may optionally include one or more of the following features. The second set of multiple linked records may be associated with a second identifier. The first identifier may be a vehicle identification (VIN) number and the second identifier may be a user identifier (ID). The first reference to the second record may be a shared attribute of the first record and the second record. The first reference may form a link between the first record and the second record. The second computing device may include a processor. The processor of the second computing device may be configured to link or provide the second record associated with a second identifier. The second record has a second reference to the first record within the first set of multiple linked record of the first cross-linked distributed ledger. The second record may have a third reference to a third record within a third set of multiple linked record of a third cross-linked distributed ledger. The first reference may link to a fourth record with the second set of multiple records.

In another aspect, the subject matter is embodied in a method linking and referencing distributed ledgers. The method includes linking a first record associated with a first identifier to a first cross-linked distributed ledger. The method includes linking a second record associated with a second identifier. The method includes linking the first cross-linked distributed ledger with the second cross-linked distributed ledger using a shared attribute between the first record and the second record. The shared attribute references the second cross-linked distributed ledger.

In another aspect, the subject matter is embodied in a set of cross-linked distributed ledgers. The set of cross linked distributed ledgers includes a first cross-linked distributed ledger and a second cross-linked distributed ledger. The first cross-linked distributed ledger includes a first set of multiple linked records with a first record. The second cross-linked distributed ledger includes a second set of multiple linked records with a second record. The first record is linked to the second cross-linked distributed ledger.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views.

DETAILED DESCRIPTION

Disclosed herein are systems, devices, apparatuses and methods for accurately and immutably logging and permanently recording records from multiple entities in different distributed ledgers and cross-indexing or cross-referencing the records. The cross-linked distributed ledgers each maintain an immutable and authenticated permanent history of records. Moreover, since each distributed ledger is stored on multiple entities, these records are verified by each entity that is a member of the distributed ledger. This allows for a decentralized authority to verify the authenticity of the records and allow for more permanent records to be stored, which improves security and simplifies the interactions in establishing a chain of trust among different entities and/or cross-linked records and/or distributed ledgers. By simplifying the number of interactions, entities may establish a chain of trust more expeditiously.

These cross-linked distributed ledgers also share an attribute and/or share a reference between the distributed ledgers. By having a shared reference between two more cross-linked distributed ledgers, an entity having access to one set of information on one cross-linked distributed ledger may have access to different additional information that is on the other cross-linked distributed ledger. For example, an employee at a car rental company can view the vehicles that the car rental company has available and view which past members rented the available vehicles. The employee at the car rental company can also view other types of cars that the past member rented from other car rental companies and determine what type of car the past member prefers. This provides the entity, such as the employee, with access to more information related to a combination of attributes.

Other benefits and advantages include the ability to determine relationships between combinations of attributes. For example, the employee at the car rental company may cross-reference a vehicle that a past member rented with the vehicles at other car rental companies that the past member rented. The employee may view the rating that the past member gave the vehicle when the past member rented the vehicle and identify the ratings of all similar vehicles that the past member rented at other car rental companies. This allows the employee to extrapolate and determine the past member's behavior and any differences in preference between the rental car company's vehicle and the other car rental companies' vehicles. Moreover, this allows an entity to identify, verify, and determine different relationships of the combination of attributes in real-time, while preserving the accuracy and history of all the records.

Figure 1:
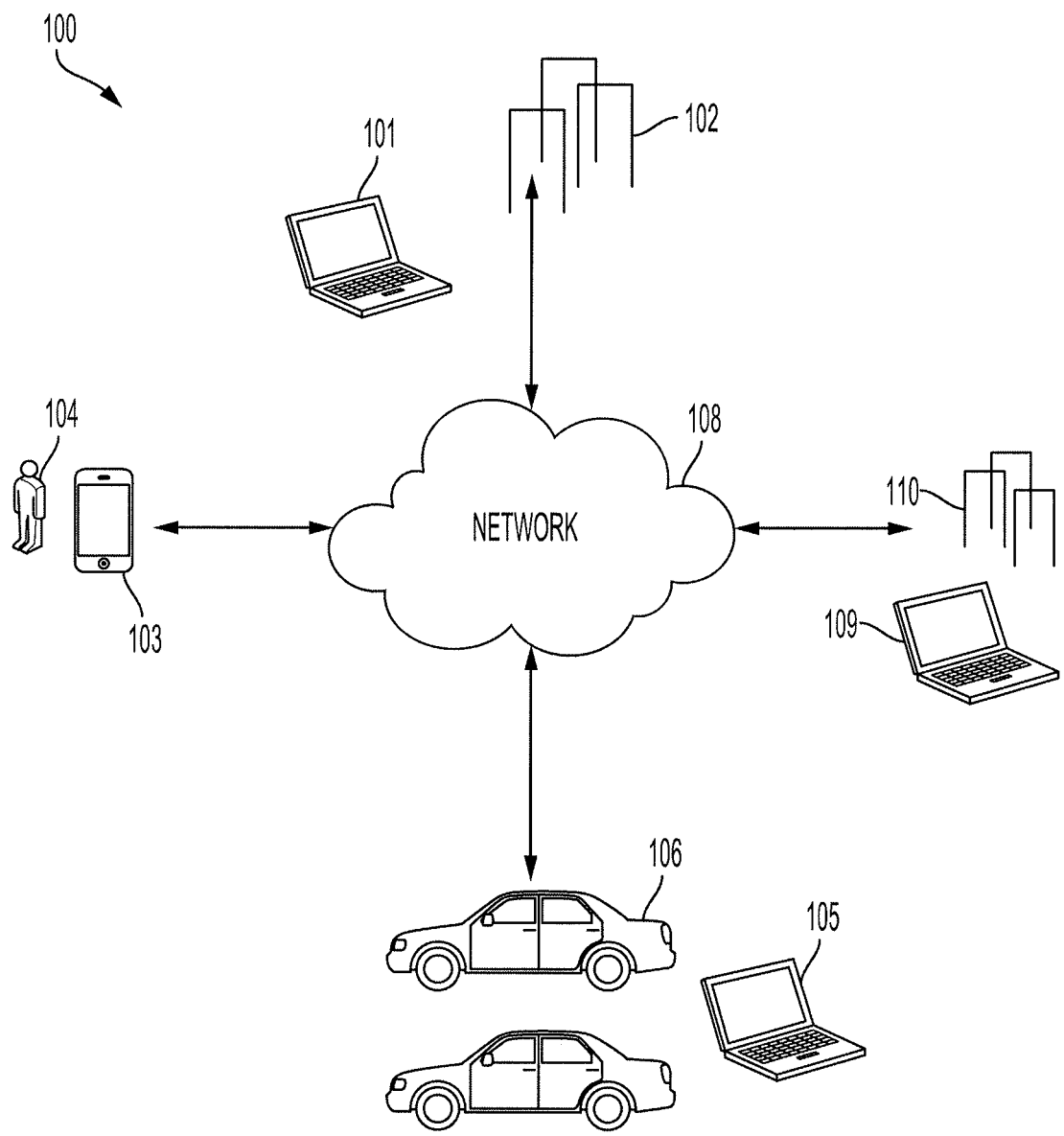
FIG. 1 is a block diagram of an example cross-referencing and indexing system according to an aspect of the invention.
Figure 3:
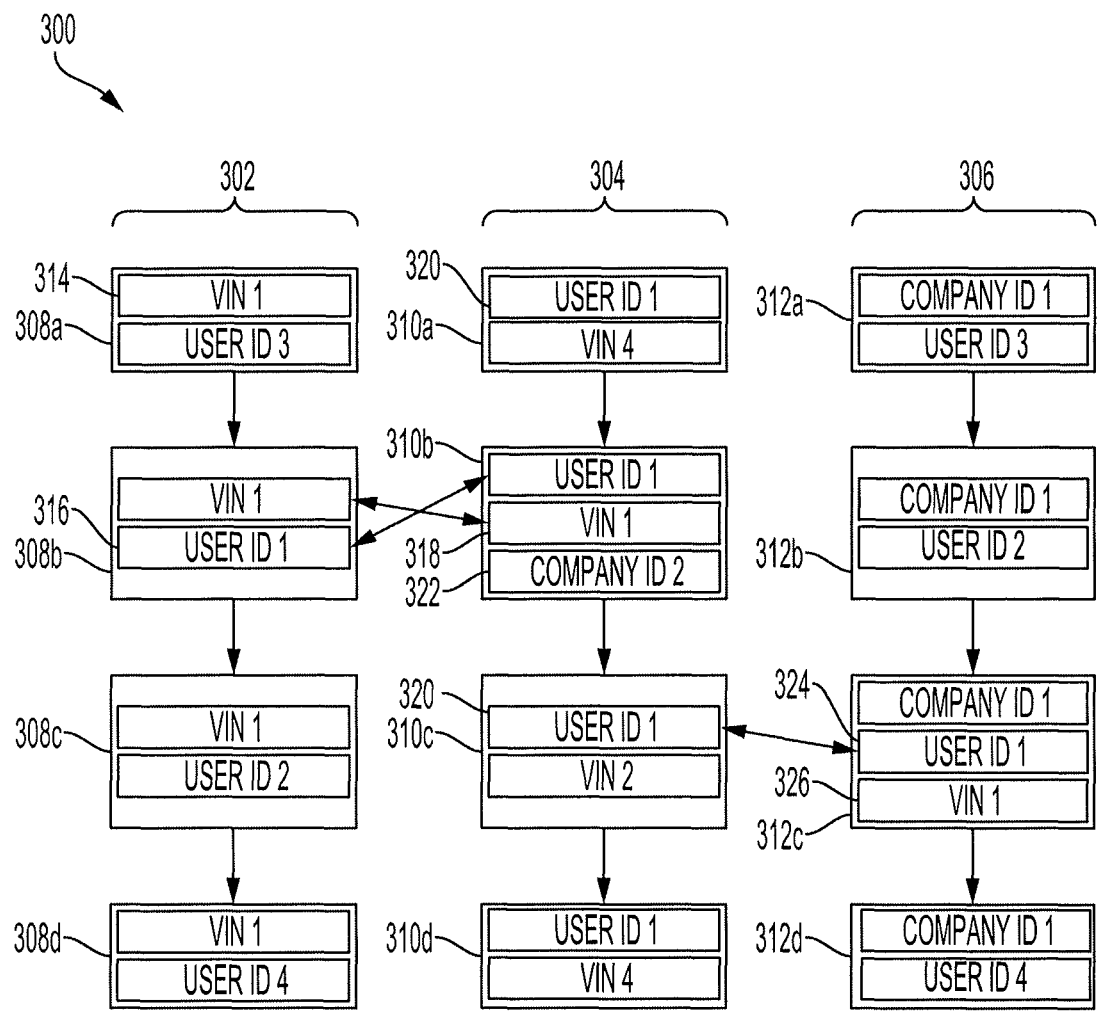
FIG. 3 is a block diagram of a set of cross-linked distributed ledgers used by the cross-referencing and indexing system of FIG. 1 according to an aspect of the invention.

FIG. 1 is a block diagram showing a cross-referencing and indexing system ("cross-referencing system") 100 that provides one or more distributed ledgers, e.g., the cross-linked distributed ledgers 302, 304, 306 of FIG. 3 for example. The one or more distributed ledgers are each maintained, managed and/or controlled by an entity of multiple entities. The one or more cross-linked distributed ledgers 302, 304, 306 are implemented as multiple computing devices 101, 103, 105, 109 associated with the rental car company 102, the rental car member 104, the vehicle 106 and/or the service center 110, respectively. The multiple entities may include one or more vehicle entities, such as one or more vehicles 106, one or more user entities, such as a rental car member 104, and/or one or more rental car entities, such as a rental car company 102, and/or a service center 110, for example. A rental car member 104 may be a person who rents a car or a passenger of a ride-sharing vehicle, such as a taxi or private vehicle contracted out for transporting passengers, for example. The computing device 101, 103, 105, 109 may be any device with a processor, such as an smartphone, laptop computer, computer, electronic control unit (ECU) or other computing device.

Each of the one or more distributed ledgers may be represented on a blockchain, and the record on the one or more distributed ledgers may be represented as a block on the blockchain. The use of storing a record on a distributed ledger allows for other entities to check, verify, and/or validate the record placed on the distributed ledger. Moreover, the distributed ledger functions as an immutable record of the recorded information. The immutable record prevents others from tampering or modifying any of the records on the distributed ledger.

Other entities may also be included, added, and/or removed from the one or more distributed ledgers. Different entities may be included, added and/or removed from different distributed ledgers. The multi-blockchain topology may share a similar attribute/identifier, and thus, by cross-referencing and/or cross-indexing among blockchains formed by different entities, additional information and relationships may be learned, for example. An entity may be part of only one distributed ledger or part of multiple distributed ledgers.

The various entities may each store, view or add one or more records to the one or more distributed ledgers using computing devices 101, 103, 105, 109 having one or more data processing apparatuses, such as a processor. Since the one or more distributed ledgers utilize multiple computing devices 101, 103, 105, 109, the one or more distributed ledgers may store a significant amount of data that may or may not be encrypted.

The computing devices 101, 103, 105, 109 of the various entities may be represented as a node within the blockchain topology and each addition of information to the distributed ledger may be represented as a block. The various entities may add to the one or more distributed ledgers to update the one or more distributed ledgers with any updates or modifications. These entities may view, obtain, and/or add to the one or more distributed ledgers to receive or provide real-time accurate information from or to the other entities.

The multiple entities may include one or more vehicle entities, such as one or more vehicles 106, one or more user entities, such as a rental car member 104, and/or one or more rental car entities, such as a rental car company 102 or a ride-sharing service, and/or a service center 110, for example.

The one or more vehicle entities may include one or more vehicles including a vehicle 106 and/or multiple vehicles. The one or more vehicle entities may utilize a computing device 105. In one example, the vehicle 106 may provide a record of the driver behavior of the driver when operating the vehicle 106. The record may include various parameters related to the operation of the vehicle 106, such as the average or absolute speed that the vehicle was operated, the relative speed in comparison to the speed limit of a roadway, the rate of deceleration and/or acceleration, the distance and locations travelled, and/or the rate of change of the steering wheel. The record may include other parameters related to the non-operation of the vehicle, such as the condition and/or cleanliness of the vehicle during the rental period. The record may be associated with one or more identifiers, such as a vehicle identification number that identifies the vehicle 106 and a user identifier, such as a member identification number, that identifies the user of the vehicle 106.

A vehicle 106 is a conveyance capable of transporting a person, an object, or a permanently or temporarily affixed apparatus. The vehicle 106 may be a self-propelled wheeled conveyance, such as a car, sports utility vehicle, truck, bus, van or other motor or battery driven or fuel cell driven vehicle. For example, the vehicle 106 may be an electric vehicle, a hybrid vehicle, a hydrogen fuel cell vehicle, a plug-in hybrid vehicle or any other type of vehicle that has a fuel cell stack, a motor and/or a generator. Other examples of vehicles include bicycles, trains, planes, or boats, and any other form of conveyance that is capable of transportation. The vehicle 106 may be semi-autonomous or autonomous. That is, the vehicle 106 may be self-maneuvering and navigate without human input. An autonomous vehicle may have and use one or more sensors and/or a navigation unit to drive autonomously.

The one or more rental car entities may include one or more rental car companies 102. The one or more rental car entities may utilize a computing device 101. In one example, the rental car company 102 may provide a record of the condition of the vehicle 106, before and after a vehicle 106 has been rented. The condition of the vehicle 106 may include any maintenance, cleanliness, and/or any damage issues. The record may include information about rental car members, such as rated rental experiences, customer service interactions, credit and/or payment information, rental history of various vehicles and/or other information related to the rental car members experience with the rental car company.

The one or more user entities may include one or more rental car members 104. The one or more user entities may utilize a computing device 103. In one example, the rental car member may provide a record of the type of cars rented, the VINs associated with each car rented, the rental companies of the cars rented, and various other information, such as the rental car member's 104 credit history, rental experience and/or locations of the rental companies. The rental car member's 104 record may include preferences for equipment on differences vehicle including the type of transmission, number of seats and/or size of the cabin, type of vehicle, smoking preferences or other devices, such as a global positioning system (GPS) device.

The one or more private entities may include a service center 110, such as a dealership, a collision center, a repair center and/or other repair facility. The one or more private entities may utilize a computing device 109. In one example, the service center 110 may provide a record of any services, repairs, maintenance, accidents, ownership, accidents or other matters related to the vehicle 106. The record may be associated to a vehicle identification number (VIN) that identifies the vehicle, and so, a rental car member 104 may have access to the information when renting the vehicle 106 from the rental car company 102.

A cross-referencing or indexing system ("cross-referencing system") 100 maintains the one or more distributed ledgers using the one or more computing devices 101, 103, 105, 109 for each of the multiple entities. The computing device may be included within, embedded within, retrofitted to or otherwise connected or coupled to the one or more entities. For example, the computing device 105 may be a processor, such as an electronic control unit (ECU) embedded and/or or included within the vehicle 106.

The cross-referencing system 100 may have a network 108 that links the multiple computing devices 101, 103, 105, 109 of the multiple entities to form one or more distributed ledgers. The network 108 may be a local area network (LAN), a wide area network (WAN), a cellular network, the Internet, or combination thereof, that connects the multiple computing devices 101, 103, 105, 109.

The computing devices of the cross-referencing system 100 collects, aggregates, analyzes and/or performs reporting of various recorded information related to a vehicle and a driver of the vehicle, for example. The computing devices obtains various types of information, such as vehicle information, user information, rental information, from various disparate and independent sources, to form a complete record of the history of the use of the vehicle and the driver on the one or more distributed ledgers for review by other entities.

Vehicle information may include a list of user identifiers associated with the drivers of the vehicle 106 and/or passengers of the vehicle 106. The vehicle information may include the driving behavior of the drivers or a passenger ride experience. The driving behavior may indicate the distance travelled, change in steering wheel angle, rate of acceleration or deceleration, the average or actual speed, and/or the relative speed the vehicle in comparison to the speed limit at a location when the driver is driving the vehicle. The vehicle information may include the categories of roadways and/or locations the driver drives the vehicle. Other vehicle information may include repair or maintenance information, such as repair or collision history, and/or maintenance history, ownership history and/or other aspects related to the vehicle, such as a vehicle identification number (VIN), for example.

Rental car information may include a list of vehicle identifiers of vehicles 106 that are owned by a rental car company 102 or are part of a ride sharing service. The rental car information may include a list of user identifiers, such as a member identification number, associated with drivers/passengers that have driven/ridden in the vehicles 106. The rental car information may include the distance travelled and/or locations travelled during the rental period. The rental car information may also include the conditions cleanliness before and/or after the rental of the vehicle. Moreover, the rental car information may include additional information, such as the options on the vehicle, type of vehicle requested, user experience rating, and/or contract parameters, such as whether optional devices or insurance was added, associated with the rental of the vehicle 106 by the driver.

User information may include a list of vehicle identifiers associated with the vehicles that the user has driven, a list of vehicles that the user has been a passenger, e.g., as part of a ride-sharing service, and/or a list of company identifiers associated with the rental car companies where the user is a member or has previously rented a vehicle. The user information may include the contract parameters including the options, price and/or insurance coverage that the user purchases when renting the vehicle. The user information may include a user experience rating of each vehicle rented, a credit history, a user profile or other user information, such as user preferences for devices or types of vehicles when renting the vehicle, a timeliness of meeting a ride-sharing vehicle. Other user information may include usage rate of a vehicle and/or driving or accident history.

Figure 2:
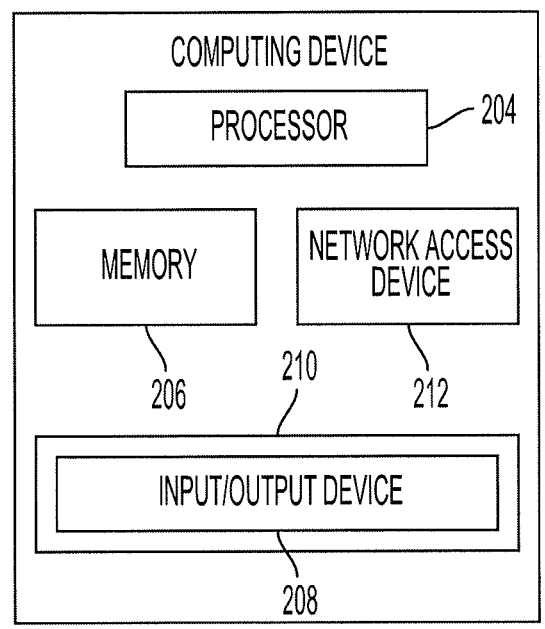
FIG. 2 is a block diagram of an example computing device of the cross-referencing and indexing system of FIG. 1 according to an aspect of the invention.

FIG. 2 is a block diagram of the one or more computing devices 101, 103, 105, 109. The computing devices 101, 103, 105, 109 include a processor 204, such as an electronic control unit (ECU), and a memory 206. The computing devices 101, 103, 105, 109 may include a user interface 210 and/or a network access device 212, and may be retrofitted, included within or otherwise connected or coupled to a corresponding entity that provides other components. For example, the computing device 105 may be connected to the vehicle 106. The vehicle 106 may include one or more other components, such as an engine, a motor and/or generator, a battery, a battery management and control unit (BMCU) and/or a navigation unit, for example.

The computing devices 101, 103, 105, 110 include one or more processors 204, such as an electronic control unit (ECU). The one or more processors 204 may be implemented as a single processor or as multiple processors. The one or more processors 204 or controllers are designed for interacting with a distributed ledger, such as reading, viewing, or adding a block to the blockchain.

The memory 206 may be coupled to the one or more processors 204 and store instructions that the one or more processors 204 executes. The memory 206 may include one or more of a Random Access Memory (RAM) or other volatile or non-volatile memory. The memory 206 may be a non-transitory memory or a data storage device, such as a hard disk drive, a solid-state disk drive, a hybrid disk drive, or other appropriate data storage, and may further store machine-readable instructions, which may be loaded and executed by the one or more processors 204.

The computing devices 101, 103, 105, 109 may include a user interface 210. The user interface 210 may include an input/output device 208 capable of receiving user input, such as a user interface element, a button, a dial, a microphone, a keyboard, or a touch screen, and any device capable of output, such as a display, a speaker, or a refreshable braille display. The user interface 210 may display one or more notifications or a record associated with the distributed ledger. The user interface 210 may receive user input that may include additional information. The additional information may include repair information, cleanliness information or vehicle condition information or any additional analysis by a rental car company employee, a technician, or other persons. For example, a repair technician may provide information regarding an accident history, parts replaced or services performed to form a record to be placed on the distributed ledger for the vehicle.

The computing devices 101, 103, 105, 109 may include a network access device 212. The network access device 212 may include a communication port or channel, such as one or more of a Wi-Fi unit, a Bluetooth® unit, a radio frequency identification (RFID) tag or reader, or a cellular network unit for accessing a cellular network (such as 3G, 4G or 5G). The network access device 212 may transmit data to and receive data from devices and systems not directly connected to the computing devices 101, 103, 105, 109. The computing devices 101, 103, 105, 109 may use the network access device 212 to communicate over the network 108.

FIG. 3 shows a block diagram of a set of cross-linked distributed ledgers 300. The set of cross-linked distributed ledgers 300 may include any number of distributed ledgers, such as the first cross-linked distributed ledger 302, the second cross-linked distributed ledger 304 and/or a third cross-linked distributed ledger 306, which are cross-linked, cross-referenced and/or cross-indexed. A cross-linked, cross-referenced and/or cross-indexed set of distributed ledgers includes at least two distributed ledgers that share an attribute and identifier combination. An attribute is a parameter that is being recorded and is related to and/or associated with the subject of the records or the identifier related to the subject within a distributed ledger. Each record may be identified by one or more identifiers, such as a vehicle identifier, a user identifier and/or a company identifier. For example a vehicle identifier may be a vehicle identification number, a user identifier may be rewards member identification number and/or a company identifier may be a phone number, a tax entity identifier or other business identifier.

The common attribute may be an attribute that links two different cross-linked distributed ledgers. For example, a vehicle may have recorded that a rental car member 104 used the vehicle within a first cross-linked distributed ledger 302 that records the history of the vehicle. A second cross-linked distributed ledger may be associated with the rental car member 104 and records information about the history of the rental car member 104. Since a record of the first cross-linked distributed ledger 302 and at least one record of the second cross-linked distributed ledger 304 is associated with the rental car member 104, the record of the first cross-linked distributed ledger 302 may link to the at least one record of the second cross-linked distributed ledger 304 that is associated with the rental car member 104.

In some implementations a cross-linked distributed ledger may have multiple shared attributes. For example, the third cross-linked distributed ledger 306 may be associated with a history of the rental car company, which may have a record associated with both a particular vehicle and/or a particular rental car member.

The set of cross-linked distributed ledgers 300 may include a first cross-linked distributed ledger 302, a second cross-linked distributed ledger 304 and/or a third cross-linked distributed ledger 306. Each cross-linked distributed ledger may have multiple records used to record the history of a different entity.

The first cross-linked distributed ledger 302 may have a history of records 308*a-d* that is related to the vehicle, for example. The records within the first cross-linked distributed ledger 302 may share a common identifier, e.g., a vehicle identifier 314, which identify the subject of the first cross-linked distributed ledger 302, such as the history of a specific vehicle. The records 308*a-d* of the first cross-linked distributed ledger 302 may have one or more attributes, such as a user attribute 316 that identifies the user identifiers of rental car members that have previously driven or ridden the vehicle associated with the vehicle identifier 314. Other attributes may include vehicle information, such as the condition of the vehicle, the maintenance on the vehicle, accident history of the vehicle and/or other vehicle information.

The second cross-linked distributed ledger 304 may have a history of records 310*a-d* that is related to a rental car member 104, for example. The records 310*a-d* may share a common identifier, e.g., a user identifier, as the records 310*a-d* may pertain to a history of a specific user, such as the rental car member 104. The records 310*a-d* may have one or more attributes, such as a vehicle attribute 318, which identify the vehicle identifiers of vehicles that the rental car member 104 has previously rented or ridden. Other attributes may include company information, such as the rental car company of the rented vehicle, user experience with that vehicle, options, devices or insurance purchased with the rental of the vehicle, credit history, payment information and/or other user information.

The third cross-linked distributed ledger 306 may have a history of records 312*a-d* that are related to rental agreements between customers, such as rental car members 104, and vehicles, such as the vehicle 106, for example. The records 312*a-d* may share a common identifier, e.g., a company identifier, as the records 312*a-d* may pertain to a history of rental agreements for a specific company. The records 312*a-d* may have one or more attributes, such as the user attribute 324, which identifies the user identifier of a user, such as a rental car member 104, that rented or rode in the vehicle, and/or the vehicle attribute 326 that identifies the vehicle identifier of a vehicle, which was rented or ridden by the user. Other attributes may include time and/or location of the rental, duration of the rental, options, devices, insurance and/or other add-ons or terms of the rental agreement, the condition of the vehicle before and/or after the rental period, distance travelled, location travelled and/or other information about the rental.

The records among the cross-linked distributed ledgers 302, 304, 306 may be cross-linked, cross-referenced and/or cross-indexed with another record among the cross-linked distributed ledgers 302, 304, 306. For example, the records 308*a-d* of the first cross-linked distributed ledger 302 share a vehicle identifier 314 in all the records 308*a-d* because the first cross-linked distributed ledger 302 is related to the same vehicle. The records 308*a-d* have different attributes because different users have driven or rented the vehicle throughout the vehicle's history. The record 308*b* includes an attribute that lists the "USER ID 1" as the driver or passenger of the vehicle associated with the record 308*b*. The attribute is a shared attribute with the second cross-linked distributed ledger 304 because the attribute "USER ID 1" is the same as the identifier associated with records 310*a-b* of the second cross-linked distributed ledger 304, i.e., the user identifier 320. Thus, the record 308*b* is linked to the other records of the second cross-linked distributed ledger 304 that have the user identifier 320 of "USER ID 1."

When two records are linked, the first record provides a reference and/or a pointer to the second record. The reference and/or the pointer may be the shared attribute, which directs an entity to another record on a different distributed ledger. The entity may or may not initially be represented or part of the entities that contribute, view and/or access the other distributed ledgers. For example, the entities that have access to the first cross-linked distributed ledger 302 that maintains the history of vehicle 106 may or may not have access to the third cross-linked distributed ledger 306 related to the rental car company 102 or the service centers 110. With cross-linked distributed ledgers, however, the entities that have access to the first cross-linked distributed ledger 302 may identify the record 308*b* and determine that the rental car member associated with the user attribute 316 rented or rode in the vehicle with the vehicle identifier 314. The entities may use the shared attribute of the user attribute 316 to identify the second cross-linked distributed ledger 304. And, within the second cross-linked distributed ledger 304, the entities may identify that the rental car member that has a user identifier 320 and that matches the user attribute 316 visited the rental car company associated with the company attribute 322 along with other information associated with the rental car member. Thus, the entities of the first cross-linked distributed ledger 302 now have access to information about the user found in the second cross-linked distributed ledger 304 that the entities did not previously have access too.

In some implementations, a record 310*c* of the second cross-linked distributed ledger 304 may link to a record 312*c* on a third cross-linked distributed ledger 306. For example, an attribute, such as the user attribute 324, of the record 312*c* may match the identifier, such as the user identifier 320, of the second cross-linked distributed ledger 304, and be used as a reference or a shared attribute between the two records 310*c*, 312*c*. The shared attribute links the two records 310*c*, 312*c* across the second cross-linked distributed ledger 304 and the third cross-linked distributed ledger 306. Thus, the entities of the first cross-linked distributed ledger 302 may traverse to the second cross-linked distributed ledger 304 via the connection between the records 308*b* and 310*b*, review the records 310*a-d* of the second cross-linked distributed ledger 304, and traverse to the third cross-linked distributed ledger 306 via the connection between the records 310*c* and 312*c*.

In some implementations, a record may be both linked by another record using one shared attribute and provide a link to the other record or another different record using another different shared attribute. For example, the record 310*b* links to and is linked by the record 308*b* using the shared attributes "USER ID 1" and "VIN 1."

Figure 4:
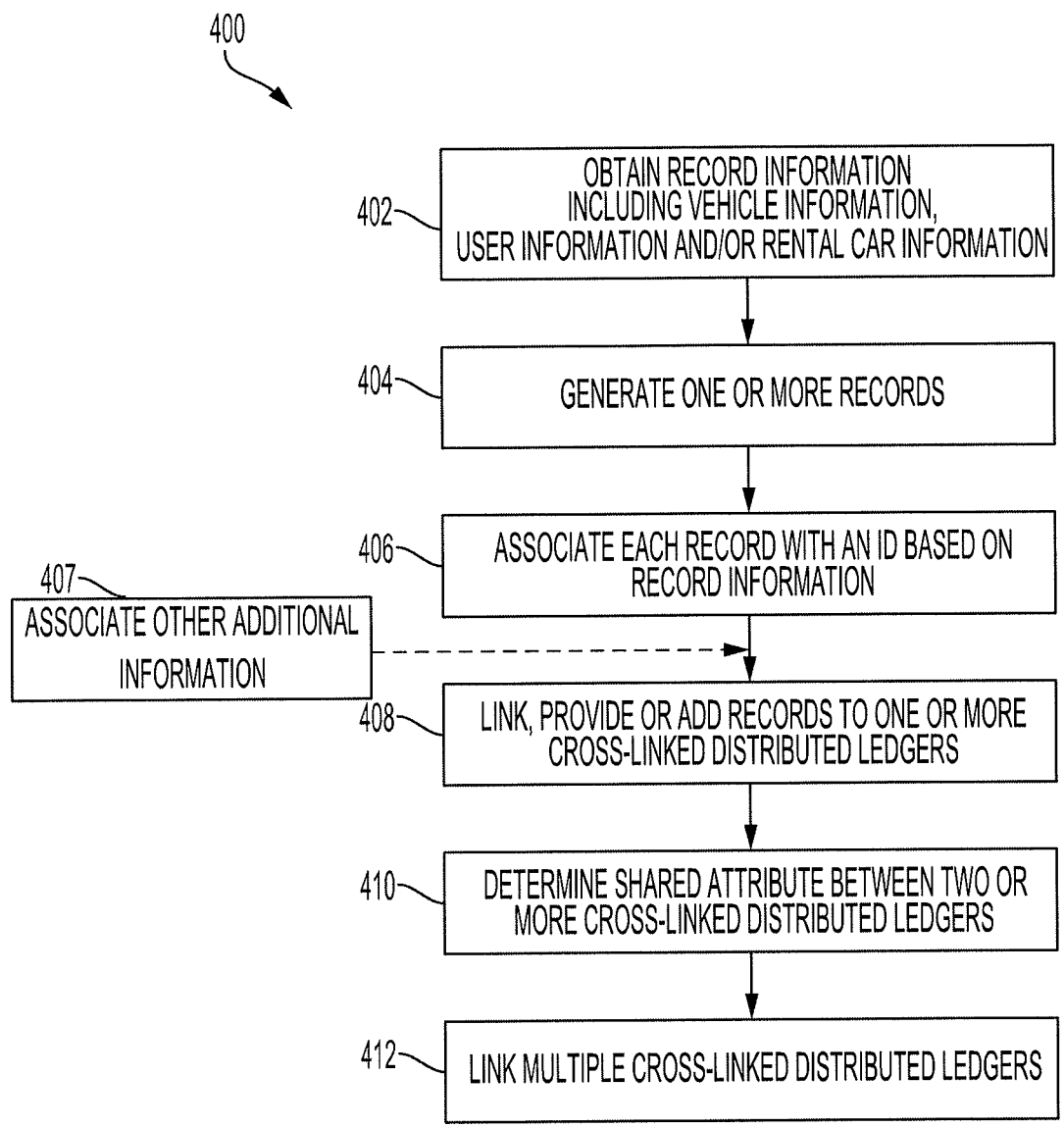
FIG. 4 is a flow diagram of an example process for forming a set of cross-linked, cross-referenced and/or cross-indexed multiple distributed ledgers of the cross-referencing and indexing system of FIG. 1 according to an aspect of the invention.

FIG. 4 is a flow diagram of a process 400 for forming a set of cross-linked, cross-referenced and/or cross-indexed multiple distributed ledgers. One or more computers or data processing apparatuses, for example, the processor 204 of one of the computing devices 101, 103, 105, 109 of the cross-referencing system 100 of FIG. 1, appropriately programmed, may implement and execute the process 400.

The cross-referencing system 100 obtains record information to form or generate records for one or more cross-linked distributed ledgers (402). The record information may include a variety of different types of information, such as vehicle information, user information and/or rental car information, for example. The one or more computing devices 101, 103, 105, 109 may receive the record information via user input through the user interface 210. In some implementations, one or more sensors, such as a vehicle speed sensor, or a navigation unit may collect the vehicle information and store the vehicle information within the memory 206, so that the cross-referencing system 100 may later obtain the information.

The cross-referencing system 100 generates one or more records based on the record information (404). The cross-referencing system 100 may generate the one or more records based on the type of record information.

For example, if the record information is vehicle information, the cross-referencing system 100 generates a record for the first cross-linked distributed ledger 302. The record for the first cross-linked distributed ledger would include the vehicle information, such as the make/model/year of the vehicle, any users associated with being a passenger and/or a renter of the vehicle, and/or the ownership of the vehicle. In another example, if the record information is user information, the cross-referencing system 100 generates a record for the second cross-linked distributed ledger 304. The record for the second cross-linked distributed ledger 304 would include the user information, such as the user's credit history or billing profile, add-ons the user prefers when renting a vehicle, the vehicles the user has rented or been a passenger, and/or other information related to the user. In another example, if the record information is rental car information, the cross-referencing system 100 generates a record for the third cross-linked distributed ledger 306. The record for the third cross-linked distributed ledger 306 would include the rental car information, such as the vehicle rented, the user who rented the vehicle, the distance travelled and/or duration of the rental period, terms of the contract and/or any other rental car information.

In some implementations, the cross-referencing system 100 may generate the record based on the computing device 101, 103, 105, 109 that received the record information. For example, if the computing device 105 associated with the vehicle 106 received or obtained the record information, such as the vehicle information, the cross-referencing system 100 may determine that the record is for the first cross-linked distributed ledger 302 that described the history of the vehicle. In some implementations, the cross-referencing system 100 may identify a tag associated or included within the recorded information to determine or identify the type of information.

The cross-referencing system 100 associates each record with an identifier, such as a vehicle identifier, a user identifier and/or a company identifier (406). The association may be based on the type of the record information that is in the records of the cross-linked distributed ledger. For example, if the record includes the vehicle information that is to be placed, added or provided to the first cross-linked distributed ledger 302, the cross-referencing system 100 associates and/or includes a vehicle identifier, such as a VIN, with the record for the first cross-linked distributed ledger 302. In another example, if the record includes the user information that is to be placed, added or provided to the second cross-linked distributed ledger 304, the cross-referencing system 100 associates and/or includes a user identifier, such as a membership identification number, with the record for the second cross-linked distributed ledger 304. In another example, if the record includes rental car information that is to be placed, added or provided to the third cross-linked distributed ledger 306, the cross-referencing system 100 associates and/or includes a company identifier, such as a tax identification number, with the record for the third cross-linked distributed ledger 306.

Once the record is associated and/or includes an identifier, the cross-referencing system 100 may associate other information with the record, such as a hash value and/or a timestamp (407). The cross-referencing system 100 may compute the hash value using the timestamp and/or identifier. The identifier and hash value may be stored within the record prior to adding the record to the distributed ledger.

The cross-referencing system 100 links, adds or provides the record to the respective distributed ledger (408). The cross-referencing system 100 may link the block associated with the record onto the blockchain that is associated with the distributed ledger to add the record to the distributed ledger. This allows the other entities to view, verify and authenticate the record on the distributed ledger in real-time. Moreover, the record may not be removed from the cross-linked distributed ledger; rather, another entity may modify the record by appending an amended record to the distributed ledger. The other entities may act on the record once the record is added to the distributed ledger.

The cross-referencing system 100 links the record to the appropriate distributed ledger based on the type of record information. The cross-referencing system 100 may identify the appropriate ledger by obtaining the identifier associated with the record and/or determining the type of information included within the record. For example, the cross-referencing system 100 may link a record with vehicle information to and associated with the vehicle identifier to a first cross-linked distributed ledger 302, another record with user information to and associated with the user identifier to a second cross-linked distributed ledger 304 and/or another record with rental car information to and associated with the rental car company identifier to a third cross-linked distributed ledger 306.

The cross-referencing system 100 determines the shared attribute between the two or more cross-linked distributed ledgers (410). The cross-referencing system 100 may compare each attribute and/or identifier in each record of each of the one or more cross-linked distributed ledgers 302, 304, 306 with each attribute and/or identifier in the other records of each of the one or more cross-linked distributed ledgers 302, 304, 306. If one attribute from one cross-linked distributed ledger matches an identifier of another cross-linked distributed ledger, the cross-referencing system 100 may determine that the attribute is a shared attribute between the two or more cross-linked distributed ledgers. A record may have multiple attributes that match multiple identifiers in different cross-linked distributed ledgers, and thus, the cross-referencing system 100 may identify multiple shared attributes for a single record. Each shared attribute is used to form a link from one cross-linked distributed ledgers to another cross-linked distributed ledger.

Once the shared attributes are identified and/or determined, the cross-referencing system 100 links the records of the multiple cross-linked distributed ledgers that have the shared attribute (412). The cross-referencing system 100 may form a pointer or provide an address within a record that directs from the record on one cross-linked distributed ledger to another record on another cross-linked distributed ledger. The cross-referencing system 100 may form the pointer or provide the address for each record with a shared attribute. This links the different cross-linked distributed ledgers and allows an entity on one computing device to traverse between two connected cross-linked distributed ledgers to access additional information.

Figure 5:
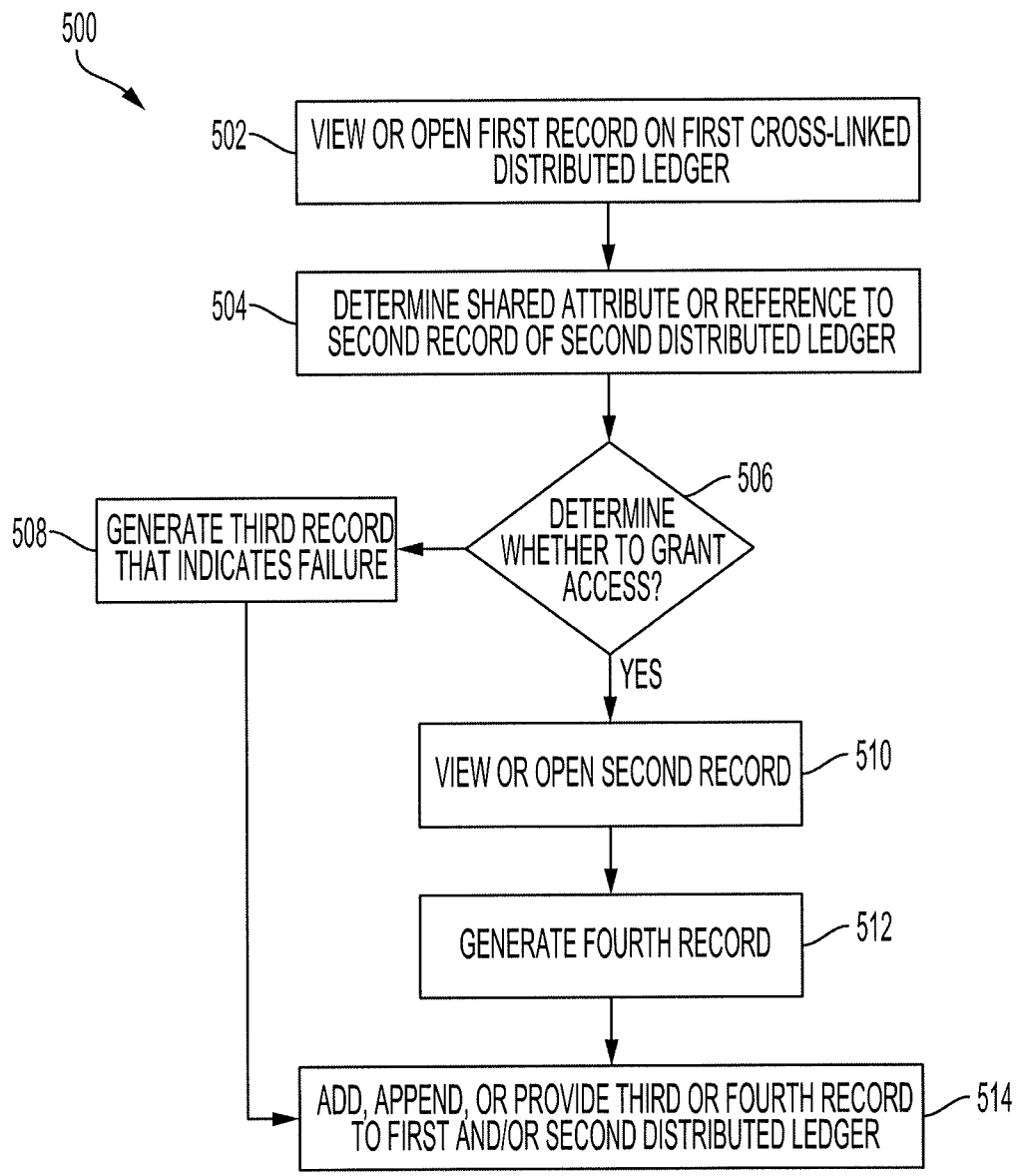
FIG. 5 is a flow diagram of an example process for using the set of cross-linked, cross-referenced and/or cross-in-

FIG. 5 is a flow diagram of a process 500 for using a set of cross-linked, cross-referenced and/or cross-indexed multiple cross-linked distributed ledgers. One or more computers or data processing apparatuses, for example, the processor 204 of one of the computing devices 101, 103, 105, 109 of the cross-referencing system 100 of FIG. 1, appropriately programmed, may implement and execute the process 500.

The cross-referencing system 100 views, opens or otherwise accesses a first record on a cross-linked distributed ledger (502). An entity using an associated computing device 101, 103, 105, 109 may open or view a record on one of the cross-linked distributed ledgers 302, 304, 306 and read and/or access the various attributes within the record. For example, a first cross-linked distributed ledger may be associated with a delivery company. A delivery person of the delivery company on a computing device, such as a smartphone or mobile device, may review a purchase order stored within a record of a cross-linked distributed ledger associated with a package delivery company. The purchase order may include a delivery address and/or a recipient.

The cross-referencing system 100 may determine that there is a shared attribute or reference within the first record to a second record of a different cross-linked distributed ledger (504). When there is a shared attribute or reference, the cross-referencing system 100 attempts to traverse the link or follow the pointer or address associated with the shared attribute or reference to the second record on the other cross-linked distributed ledger. For example, as the delivery person is in proximity to deliver a package to a vehicle of the recipient, the delivery person attempts to access a portion of the vehicle, such as the trunk, by notifying the cross-linked distributed ledger associated with the recipient and/or the vehicle associated with the recipient that the delivery person is in proximity of the vehicle.

Once the cross-referencing system 100 attempts to traverse the second record, the cross-referencing system 100 may determine whether to grant access to the second record (506). The cross-referencing system 100 may determine whether to grant access based on a timestamp, for example, as the access to the second record from the first record may be temporary or limited in duration. For example, the delivery person may only be granted access to deliver the package to the vehicle during a delivery window.

When an entity of the cross-linked distributed ledger, which does not already have original access to the other cross-linked distributed ledger, traverses to the other cross-linked distributed ledger via the shared attribute or reference, the entity of the cross-linked distributed ledger may have access to the record that is linked and may have access to the other records on the other cross-linked distributed ledger. Moreover, in some implementations, the entity of the cross-linked distributed ledger may now add another record to the other cross-linked distributed ledger. The type of access and duration of access may depend on privileges set and/or pre-defined.

If the cross-referencing system 100 is denied access, the cross-referencing system 100 generates a third record that indicates that access to the second record was denied (508). The record may indicate that time that the link was attempted to be traversed, the entity that attempted to traverse the link and/or the reason for the denial. For example, if the delivery person arrives outside the delivery window to the vehicle, a record indicating that the delivery person attempted to deliver the package along with time and/or location information related to the attempted delivery may be generated.

If the cross-referencing system 100 is allowed access, the cross-referencing system 100 views or opens the second record (510). The second record may provide additional information to the entity that is requesting access to the second record on the other distributed ledger. For example, the delivery person may be granted access to the vehicle by being provided a code or by unlocking the vehicle and have access to special handling and/or storage instructions for the package.

In some implementations, the cross-referencing system 100 may determine that only a limited portion of the second record may be accessible from the first record. For example, the delivery person may only be able to view a code that unlocks the trunk of the vehicle, but not other portions of the vehicle. In another example, access to a portion of the second record may allow access to a particular portion of the vehicle and not the entire vehicle, e.g., the trunk.

After opening and viewing the second record, the cross-referencing system 100 may generate a fourth record (512). The fourth record is generated in response to a successful traversal of the link between two different cross-linked distributed ledgers. The fourth record may indicate that the entity that attempted to access the second record was granted access. For example, when the delivery person successfully completes delivery of the package to the vehicle, as indicated in the purchase order, the delivery person may generate a delivery confirmation record that indicates the time, location and/or successful delivery of the package. The fourth record may indicate the time the record was created. The fourth record may indicate a time of actual delivery, for example.

The cross-referencing system 100 may add, provide and/or append the third or fourth record to one or both of the cross-linked distributed ledgers associated with the first or second records (514). The cross-referencing system 100 adds, provides, and/or appends the third record to the cross-linked distributed ledger when access is not granted and the fourth record to the cross-linked distributed ledger and/or the other cross-linked distributed ledger when access was previously granted.

By appending the third record to the cross-linked distributed ledger when access was denied, entities viewing the records on the cross-linked distributed ledger may identify that the entity was unable to traverse the link to access the other cross-linked distributed ledger. For example, the third record may indicate that the delivery person was unable to deliver the package.

By appending the fourth record to one or both of the cross-linked distributed ledgers, the cross-referencing system 100 adds or provides records to the cross-linked distributed ledgers, which allows other entities within the cross-linked distributed ledgers to view the fourth record, e.g., that the entity accessed the second record and now has access to the other cross-linked distributed ledger. For example, when the cross-referencing system 100 generates the delivery confirmation in response to the successful delivery of the package to the vehicle, the cross-referencing system 100 may add the record with the delivery confirmation to the distributed ledger associated with the package delivery company so that the package delivery company is aware of the successful delivery. Moreover, the cross-referencing system 100 may place the delivery confirmation on the distributed ledger of the recipient and/or the vehicle of the recipient so that the recipient is aware that the package has been delivered. This allows for authentication by multiple entities of both ledgers to verify successful access to the other distributed ledgers, e.g., authenticated delivery confirmation to multiple entities on both cross-linked distributed ledgers.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A cross-referencing system, comprising:
a plurality of computing devices including a first computing device and a second computing device, one or more computing devices of the plurality of computing devices being configured to maintain a first cross-linked distributed ledger represented by a first blockchain, the first cross linked distributed ledger having a first plurality of linked records that are associated with a first identifier, wherein the first computing device includes:
a processor configured to link or provide a first record associated with the first identifier to the first cross-linked distributed ledger, the first record having a first reference to a second record within a second plurality of linked records of a second cross-linked distributed ledger represented by a second blockchain.

2. The cross-referencing system of claim 1, wherein the second plurality of linked records is associated with a second identifier.

3. The cross-referencing system of claim 2, wherein the first identifier is a vehicle identification number (VIN) and the second identifier a user identifier (ID).

4. The cross-referencing system of claim 1, wherein the first reference to the second record is a shared attribute of the first record and the second record and forms a link between the first record of the first cross-linked distributed ledger and the second record of the second cross-linked distributed ledger.

5. The cross-referencing system of claim 1, wherein the second computing device includes a processor configured to:
 link or provide the second record associated with a second identifier to the second cross-linked distributed ledger, the second record has a second reference to the first record within the first plurality of linked records of the first cross-linked distributed ledger.

6. The cross-referencing system of claim 5, wherein the second record has a third reference to a third record within a third plurality of linked records of a third cross-linked distributed ledger.

7. The cross-referencing system of claim 6, wherein the first reference links to a fourth record within the second plurality of linked records of the second cross-linked distributed ledger.

* * * * *